US010698814B2

(12) United States Patent
Lin et al.

(10) Patent No.: US 10,698,814 B2
(45) Date of Patent: Jun. 30, 2020

(54) DATA STORAGE DEVICES AND DATA PROCESSING METHODS

(71) Applicant: Silicon Motion, Inc., Jhubei, Hsinchu County (TW)

(72) Inventors: Hsuan-Ping Lin, Taichung (TW); Chia-Chi Liang, Zhubei (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 16/249,099

(22) Filed: Jan. 16, 2019

(65) Prior Publication Data

US 2019/0227929 A1   Jul. 25, 2019

(30) Foreign Application Priority Data

Jan. 19, 2018  (TW) .............................. 107102032 A

(51) Int. Cl.
*G06F 12/06*  (2006.01)
*G06F 3/06*  (2006.01)

(52) U.S. Cl.
CPC ........ *G06F 12/0615* (2013.01); *G06F 3/0604* (2013.01); *G06F 3/0655* (2013.01); *G06F 3/0673* (2013.01); *G06F 2212/7201* (2013.01)

(58) Field of Classification Search
CPC .. G06F 12/0615; G06F 3/0604; G06F 3/0655; G06F 3/0673; G06F 2212/7201
See application file for complete search history.

(56) References Cited

U.S. PATENT DOCUMENTS

| 5,301,288 A | * | 4/1994 | Newman | ............ | G06F 12/0292 |
| | | | | | 711/202 |
| 5,946,714 A | * | 8/1999 | Miyauchi | ............ | G06F 12/0246 |
| | | | | | 711/205 |

(Continued)

FOREIGN PATENT DOCUMENTS

| TW | 200921385 A | 5/2009 |
| TW | 200935221 A | 8/2009 |
| WO | 2014/144449 A1 | 9/2014 |

OTHER PUBLICATIONS

"Array Dimensions in Visual Basic" Maria Wenzel https://docs.microsoft.com/en-us/dotnet/visual-basic/programming-guide/language-features/arrays/array-dimensions (Year: 2015).*

*Primary Examiner* — Kevin Verbrugge
(74) *Attorney, Agent, or Firm* — Winston Hsu

(57) ABSTRACT

A data storage device includes a memory device and a memory controller. The memory controller is coupled to the memory device and configured to access the memory device and establish a physical to logical address mapping table and a logical address section table. The logical address section table records statuses of a plurality of logical address sections. Each status is utilized to indicate whether the physical to logical address mapping table records any logical address that belongs to the corresponding logical address section. The logical address section table includes a plurality of section bits in a plurality of dimensions. When the memory controller receives a write command to write data of a first predetermined logical address, the memory controller determines the section bit of each dimension corresponding to the first predetermined logical address, and accordingly sets a corresponding digital value for each section bit.

14 Claims, 11 Drawing Sheets

(56) References Cited

U.S. PATENT DOCUMENTS

| | | |
|---|---|---|
| 2004/0186946 A1* | 9/2004 | Lee .................. G06F 3/0616 711/103 |
| 2008/0320214 A1 | 12/2008 | Ma et al. |
| 2014/0281145 A1 | 9/2014 | Tomlin et al. |
| 2015/0347229 A1 | 12/2015 | Higgins et al. |

* cited by examiner

|  | Bit_0<br>Section_(8n+0) | Bit_1<br>Section_(8n+1) | Bit_2<br>Section_(8n+2) | ... | Bit_7<br>Section_(8n+7) |
|---|---|---|---|---|---|
| *Bit_0 | Section_0 | Section_1 | Section_2 | ... | Section_7 |
| *Bit_1 | Section_8 | Section_9 | Section_10 | ... | Section_15 |
| *Bit_2 | Section_16 | Section_17 | Section_18 | ... | Section_31 |
| ... | ... | ... | ... | ... | ... |
| *Bit_7 | Section_56 | Section_57 | Section_58 | ... | Section_63 |

| (*Bit,Bit) | Bit_0 | Bit_1 | Bit_2 | ... | Bit_7 |
|---|---|---|---|---|---|
| *Bit_0 | (1,1) | (1,1) | (1,1) | ... | (0,0) |
| *Bit_1 | (0,1) | (0,1) | (0,1) | ... | (0,0) |
| *Bit_2 | (0,1) | (0,1) | (0,1) | ... | (0,0) |
| ... | ... | ... | ... | ... | ... |
| *Bit_7 | (0,1) | (0,1) | (0,1) | ... | (0,0) |

| Section number | The section bits of the first dimension | The section bits of the second dimension |
|---|---|---|
| 0 | Bit_0 | *Bit_0 |
| 1 | Bit_1 | *Bit_0 |
| 2 | Bit_2 | *Bit_0 |
| 3 | Bit_3 | *Bit_0 |
| 4 | Bit_4 | *Bit_0 |
| 5 | Bit_5 | *Bit_0 |
| 6 | Bit_6 | *Bit_0 |
| 7 | Bit_7 | *Bit_0 |
| 8 | Bit_0 | *Bit_1 |
| 9 | Bit_1 | *Bit_1 |
| 10 | Bit_2 | *Bit_1 |
| 11 | Bit_3 | *Bit_1 |
| 12 | Bit_4 | *Bit_1 |
| 13 | Bit_5 | *Bit_1 |
| 14 | Bit_6 | *Bit_1 |
| 15 | Bit_7 | *Bit_1 |
| 16 | Bit_0 | *Bit_2 |
| 17 | Bit_1 | *Bit_2 |
| 18 | Bit_2 | *Bit_2 |
| 19 | Bit_3 | *Bit_2 |
| 20 | Bit_4 | *Bit_2 |
| 21 | Bit_5 | *Bit_2 |
| 22 | Bit_6 | *Bit_2 |
| 23 | Bit_7 | *Bit_2 |
| 24 | Bit_0 | *Bit_3 |
| 25 | Bit_1 | *Bit_3 |
| 26 | Bit_2 | *Bit_3 |
| 27 | Bit_3 | *Bit_3 |
| 28 | Bit_4 | *Bit_3 |
| 29 | Bit_5 | *Bit_3 |
| 30 | Bit_6 | *Bit_3 |

FIG. 7A

| | | |
|---|---|---|
| 31 | Bit_7 | *Bit_3 |
| 32 | Bit_0 | *Bit_4 |
| 33 | Bit_1 | *Bit_4 |
| 34 | Bit_2 | *Bit_4 |
| 35 | Bit_3 | *Bit_4 |
| 36 | Bit_4 | *Bit_4 |
| 37 | Bit_5 | *Bit_4 |
| 38 | Bit_6 | *Bit_4 |
| 39 | Bit_7 | *Bit_4 |
| 40 | Bit_0 | *Bit_5 |
| 41 | Bit_1 | *Bit_5 |
| 42 | Bit_2 | *Bit_5 |
| 43 | Bit_3 | *Bit_5 |
| 44 | Bit_4 | *Bit_5 |
| 45 | Bit_5 | *Bit_5 |
| 46 | Bit_6 | *Bit_5 |
| 47 | Bit_7 | *Bit_5 |
| 48 | Bit_0 | *Bit_6 |
| 49 | Bit_1 | *Bit_6 |
| 50 | Bit_2 | *Bit_6 |
| 51 | Bit_3 | *Bit_6 |
| 52 | Bit_4 | *Bit_6 |
| 53 | Bit_5 | *Bit_6 |
| 54 | Bit_6 | *Bit_6 |
| 55 | Bit_7 | *Bit_6 |
| 56 | Bit_0 | *Bit_7 |
| 57 | Bit_1 | *Bit_7 |
| 58 | Bit_2 | *Bit_7 |
| 59 | Bit_3 | *Bit_7 |
| 60 | Bit_4 | *Bit_7 |
| 61 | Bit_5 | *Bit_7 |
| 62 | Bit_6 | *Bit_7 |
| 63 | Bit_7 | *Bit_7 |

FIG. 7B

| Section number | The section bits of the first dimension | The section bits of the second dimension | The section bits of the third dimension |
|---|---|---|---|
| 0 | Bit_0 | *Bit_0 | **Bit_0 |
| 1 | Bit_1 | *Bit_0 | **Bit_0 |
| 2 | Bit_2 | *Bit_0 | **Bit_0 |
| 3 | Bit_3 | *Bit_0 | **Bit_0 |
| 4 | Bit_0 | *Bit_1 | **Bit_0 |
| 5 | Bit_1 | *Bit_1 | **Bit_0 |
| 6 | Bit_2 | *Bit_1 | **Bit_0 |
| 7 | Bit_3 | *Bit_1 | **Bit_0 |
| 8 | Bit_0 | *Bit_2 | **Bit_0 |
| 9 | Bit_1 | *Bit_2 | **Bit_0 |
| 10 | Bit_2 | *Bit_2 | **Bit_0 |
| 11 | Bit_3 | *Bit_2 | **Bit_0 |
| 12 | Bit_0 | *Bit_3 | **Bit_0 |
| 13 | Bit_1 | *Bit_3 | **Bit_0 |
| 14 | Bit_2 | *Bit_3 | **Bit_0 |
| 15 | Bit_3 | *Bit_3 | **Bit_0 |
| 16 | Bit_0 | *Bit_0 | **Bit_1 |
| 17 | Bit_1 | *Bit_0 | **Bit_1 |
| 18 | Bit_2 | *Bit_0 | **Bit_1 |
| 19 | Bit_3 | *Bit_0 | **Bit_1 |
| 20 | Bit_0 | *Bit_1 | **Bit_1 |
| 21 | Bit_1 | *Bit_1 | **Bit_1 |
| 22 | Bit_2 | *Bit_1 | **Bit_1 |
| 23 | Bit_3 | *Bit_1 | **Bit_1 |
| 24 | Bit_0 | *Bit_2 | **Bit_1 |
| 25 | Bit_1 | *Bit_2 | **Bit_1 |
| 26 | Bit_2 | *Bit_2 | **Bit_1 |
| 27 | Bit_3 | *Bit_2 | **Bit_1 |
| 28 | Bit_0 | *Bit_3 | **Bit_1 |
| 29 | Bit_1 | *Bit_3 | **Bit_1 |
| 30 | Bit_2 | *Bit_3 | **Bit_1 |

FIG. 8A

| | | | |
|---|---|---|---|
| 31 | Bit_3 | *Bit_3 | **Bit_1 |
| 32 | Bit_0 | *Bit_0 | **Bit_2 |
| 33 | Bit_1 | *Bit_0 | **Bit_2 |
| 34 | Bit_2 | *Bit_0 | **Bit_2 |
| 35 | Bit_3 | *Bit_0 | **Bit_2 |
| 36 | Bit_0 | *Bit_1 | **Bit_2 |
| 37 | Bit_1 | *Bit_1 | **Bit_2 |
| 38 | Bit_2 | *Bit_1 | **Bit_2 |
| 39 | Bit_3 | *Bit_1 | **Bit_2 |
| 40 | Bit_0 | *Bit_2 | **Bit_2 |
| 41 | Bit_1 | *Bit_2 | **Bit_2 |
| 42 | Bit_2 | *Bit_2 | **Bit_2 |
| 43 | Bit_3 | *Bit_2 | **Bit_2 |
| 44 | Bit_0 | *Bit_3 | **Bit_2 |
| 45 | Bit_1 | *Bit_3 | **Bit_2 |
| 46 | Bit_2 | *Bit_3 | **Bit_2 |
| 47 | Bit_3 | *Bit_3 | **Bit_2 |
| 48 | Bit_0 | *Bit_0 | **Bit_3 |
| 49 | Bit_1 | *Bit_0 | **Bit_3 |
| 50 | Bit_2 | *Bit_0 | **Bit_3 |
| 51 | Bit_3 | *Bit_0 | **Bit_3 |
| 52 | Bit_0 | *Bit_1 | **Bit_3 |
| 53 | Bit_1 | *Bit_1 | **Bit_3 |
| 54 | Bit_2 | *Bit_1 | **Bit_3 |
| 55 | Bit_3 | *Bit_1 | **Bit_3 |
| 56 | Bit_0 | *Bit_2 | **Bit_3 |
| 57 | Bit_1 | *Bit_2 | **Bit_3 |
| 58 | Bit_2 | *Bit_2 | **Bit_3 |
| 59 | Bit_3 | *Bit_2 | **Bit_3 |
| 60 | Bit_0 | *Bit_3 | **Bit_3 |
| 61 | Bit_1 | *Bit_3 | **Bit_3 |
| 62 | Bit_2 | *Bit_3 | **Bit_3 |
| 63 | Bit_3 | *Bit_3 | **Bit_3 |

FIG. 8B

# DATA STORAGE DEVICES AND DATA PROCESSING METHODS

CROSS REFERENCE TO RELATED APPLICATIONS

This Application claims priority of Taiwan Patent Application No. 107102032, filed on Jan. 19, 2018, the entirety of which is incorporated by reference herein.

BACKGROUND OF THE INVENTION

Field of the Invention

The invention relates to a data processing method capable of improving performance of a data storage device and greatly reducing the time required to find a physical address associated with an access operation.

Description of the Related Art

With the rapid growth of data storage technology in recent years, many data storage devices—such as memory cards manufactured in compliance with the SD/MMC standards, CF standards, MS standards or XD standards, as well as solid state hard drives, Embedded Multi Media Cards (eMMC) and Universal Flash Storage (UFS)—have been used widely for a variety of purposes. Therefore, effective control of access to these data storage devices is an important issue.

A physical to logical address mapping table or a logical to physical address mapping table is generally stored in a buffer memory of the data storage device and is provided for the memory controller to search for a physical address to be accessed in response to a read command during the access operations of the data storage device. However, as the sizes of memory blocks and the number of pages comprised in a memory block increase, the size of the above-mentioned mapping tables increases as well. Therefore, the time required for the memory controller to find the required physical address will be greatly increased, and the efficiency of accessing the data storage device degrades.

Therefore, a data processing method capable of improving access performance of a data storage device and greatly reducing the time required to find a physical address is proposed.

BRIEF SUMMARY OF THE INVENTION

Data storage devices and data processing methods are provided. An exemplary embodiment of a data storage device comprises a memory device and a memory controller. The memory controller is coupled to the memory device, and is configured to access the memory device and establish a physical to logical address mapping table and a logical address section table. The physical to logical address mapping table comprises consecutive physical addresses and their corresponding logical addresses. The logical address section table records statuses of a plurality of logical address sections. One status corresponds to one logical address section and each status is utilized to indicate whether the physical to logical address mapping table records any logical address that belongs to the corresponding logical address section. The logical address section table comprises a plurality of section bits in a plurality of dimensions, so as to distinguish between different logical address sections. When the memory controller receives a write command to write data of a first predetermined logical address to the memory device, the memory controller is configured to determine the section bit of each dimension corresponding to the first predetermined logical address according to the first predetermined logical address, and accordingly set a corresponding digital value for each section bit.

An exemplary embodiment of a data processing method for a data storage device comprising a memory device and a memory controller coupled to the memory device for accessing the memory device comprises: establishing a physical to logical address mapping table, wherein the physical to logical address mapping table comprises consecutive physical addresses and their corresponding logical addresses; establishing a logical address section table, wherein the logical address section table records statuses of a plurality of logical address sections, one status corresponds to one logical address section and each status is utilized to indicate whether the physical to logical address mapping table records any logical address that belongs to the corresponding logical address section, and wherein the logical address section table comprises a plurality of section bits in a plurality of dimensions, so as to distinguish between different logical address sections, and receiving a write command to write data of a first predetermined logical address to the memory device; and determining the section bit of each dimension corresponding to the first predetermined logical address according to the first predetermined logical address and accordingly setting a corresponding digital value for each section bit.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 4 is an exemplary schematic diagram showing the logical address sections recorded in the logical address section table according to an embodiment of the invention;

FIG. 5 is a schematic diagram of a logical address section table according to an embodiment of the invention;

FIG. 7A and FIG. 7B show the section numbers and the corresponding section bits of a 2-dimensional logical address section table according to an embodiment of the invention;

FIG. 8A and FIG. 8B show the section numbers and the corresponding section bits of a 3-dimensional logical address section table according to an embodiment of the invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
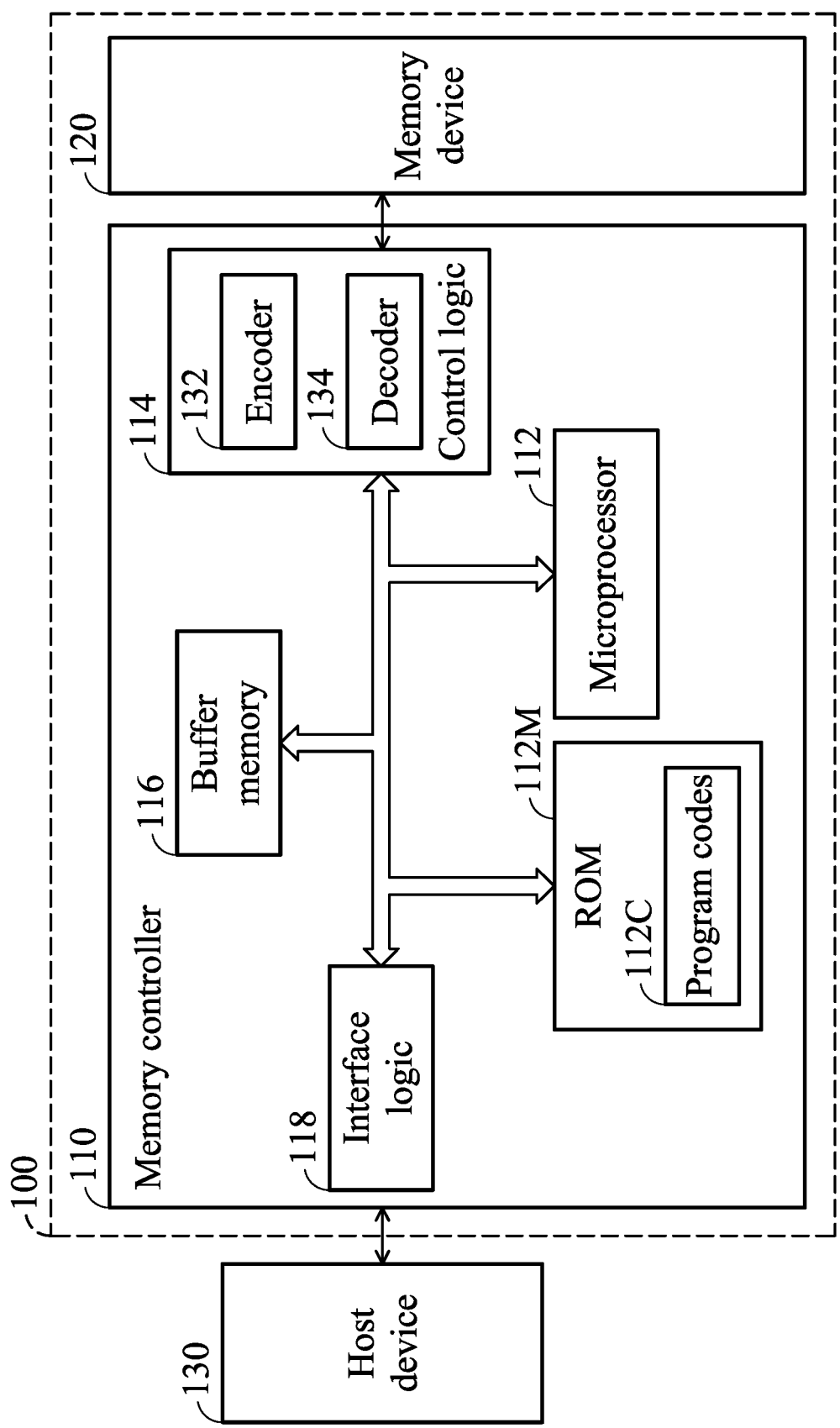
FIG. 1 shows an exemplary block diagram of a data storage device 100 according to an embodiment of the invention.

FIG. 1 shows an exemplary block diagram of a data storage device 100 according to an embodiment of the invention. The data storage device 100 may comprise a memory device 120, such as a flash memory module, and a memory controller 110. The memory controller 110 is configured to access the memory device 120. According to an embodiment of the invention, the memory controller 110 may comprise a microprocessor 112, a Read Only Memory (ROM) 112M, a control logic 114, a buffer memory 116 and an interface logic 118. The ROM 112M is configured to store program codes 112C. The microprocessor 112 is configured to execute the program codes 112C, thereby controlling access to the memory device 120. The control logic 114 may comprise an encoder 132 and a decoder 134. The encoder 132 is configured to encode the data to be written into the memory device 120 so as to generate corresponding correcting/checking code (also called error correction code (ECC)). The decoder 134 is configured decode the data read out from the memory device 120.

Typically, the memory device 120 may comprise a plurality of flash memory chips, and each flash memory chip may comprise a plurality of memory blocks. The access unit of an erase operation performed by the controller (e.g., the memory controller 110, through executing the program codes 112C by the microprocessor 112) on the memory device 120 may be one memory block. In addition, a memory block may record a predetermined number of pages, and the access unit of a write operation performed by the controller (e.g., the memory controller 110, through executing the program codes 112C by the microprocessor 112) on the memory device 120 may be one page.

In practice, the memory controller 110 may perform various control operations by using its own internal components through executing the program codes 112C by the microprocessor 112. For example, the memory controller 110 may use the control logic 114 to control the access operations (especially the access operation for at least a memory block or at least a page) of the memory device 120, use the buffer memory 116 to perform necessary data buffer operations, and use the interface logic 118 to communicate with a host device 130. The buffer memory 116 may be implemented by a Random Access Memory (RAM). For example, the buffer memory 116 may be an SRAM, but the invention should not be limited thereto.

In an embodiment of the invention, the data storage device 100 may be a portable storage device (for example, the memory card in compliance with the SD/MMC, CF, MS and/or XD standard), and the host device 130 may be an electronic device, such as a mobile phone, a notebook computer, a desktop computer . . . etc., capable of connecting to the data storage device. In another embodiment of the invention, the data storage device 100 may be a solid state hard disk or an embedded storage device in compliance with the Universal Flash Storage (UFS) or the Embedded Multi Media Card (EMMC) standards, and may be equipped in an electronic device such as a mobile phone, a notebook computer, or a desktop computer. In such an embodiment, the host device 130 may be a processor of the electronic device.

The host device 130 may issue commands, such as the read commands or the write commands, to the data storage device 100, so as to access the data stored in the memory device 120, or the host device 130 may issue commands to further control or manage the data storage device 100.

Figure 2:
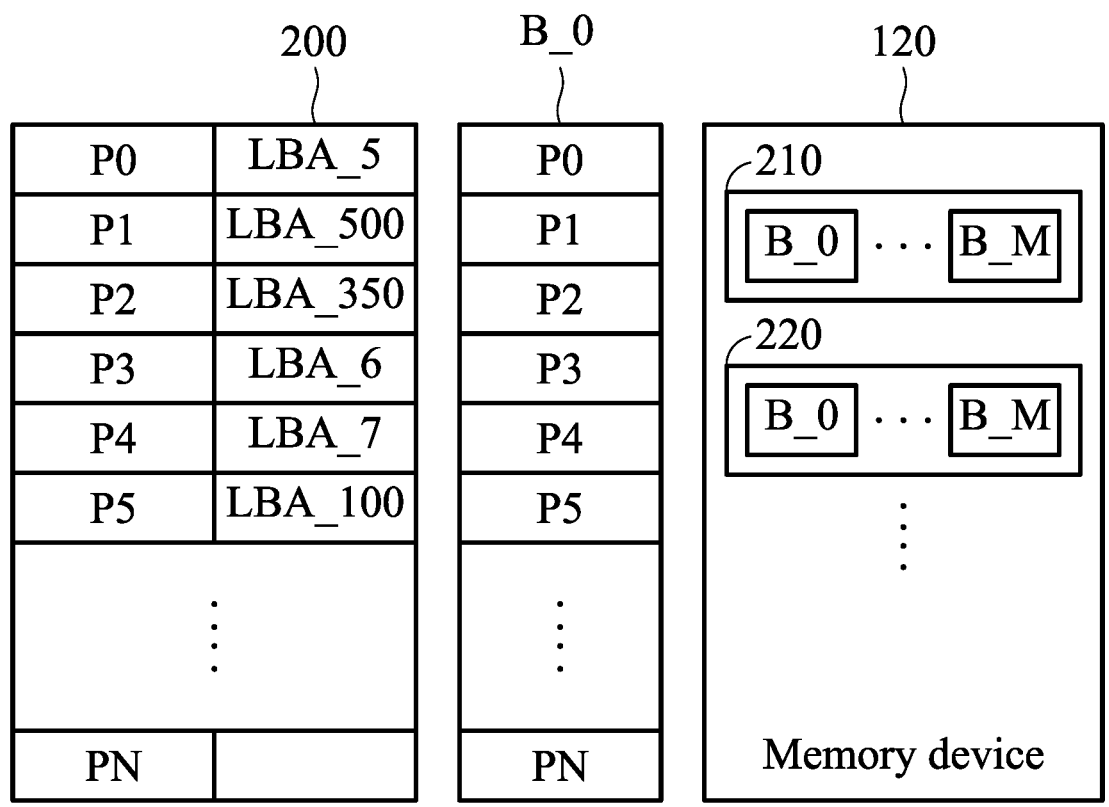
FIG. 2 is a schematic diagram of a memory device and its corresponding physical to logical address mapping table according to an embodiment of the invention.

FIG. 2 is a schematic diagram of a memory device and its corresponding physical to logical address mapping table according to an embodiment of the invention. According to an embodiment of the invention, the memory device 120 may comprise a plurality of flash memory chips, such as the flash memory chips 210 and 220. Each flash memory chip may comprise a plurality of memory blocks B_0~B_M, and each memory block may comprise N pages P0~PN, where N is a positive integer. In the following paragraphs, the memory controller 110 is configured to sequentially write data into the pages of the memory block B_0. However, it should be noted that in practice, the above mentioned "memory blocks" may also comprise a plurality of memory blocks of a plurality of chips located in different planes (which is generally called the "super block"). For example, suppose that both the flash memory chips 210 and 220 comprise two planes, and the memory blocks B_0 and B_M are located in different planes, the memory blocks B_0 and B_M of the flash memory chip 210 and the memory blocks B_0 and B_M of the flash memory chip 220 may form a super block. For simplicity, in the following paragraph, the memory block B_0 is utilized as an exemplary memory block for illustration. However, those who are skilled in this technology will understand that similar concepts, as illustrated in the following paragraphs, can also be applied to super blocks.

When writing data into the memory block B_0, the micro-processor 112 is configured to establish a physical to logical address mapping table (hereinafter called a P2L table) 200 and store the P2L table 200 in the buffer memory 116. The P2L table 200 may comprise physical addresses (i.e. the consecutive physical addresses) of consecutive pages P0~PN in the memory block B_0 and their corresponding logical addresses. To be more specific, the memory controller 110 may first write the data, which is received from the host device 130 and has a logical address LBA_5, into the page P0. Next, the memory controller 110 may then write the data, which is sequentially received from the host device 130 and have the logical addresses LBA_500, LBA_350, LBA_6, LBA_7 and LBA_100, into the pages P1~P5. In addition, when all the pages P0~PN of the memory block B_0 are written with data, the micro-processor 112 may further store the P2L table 200 in the memory device 120. It should be noted that in the embodiment, the serial numbers of the logical addresses represents their order, and consecutive serial numbers represent consecutive logical addresses.

As discussed above, as the size of a memory device increases, the number of memory blocks and the number of pages comprised in a memory block increase, accordingly, and the size of the P2L table 200 increases as well. Therefore, the time required for the memory controller to find the required physical address from the P2L table 200 will be greatly increased, and the efficiency of accessing the data storage device degrades.

To solve this problem, a novel structure of a multi-dimensional logical address section table and a data processing method for a data storage device to utilize the multi-dimensional logical address section table are proposed. By applying the proposed structure and data processing method, not only can the access performance of the data storage device and the accuracy of positioning the location of the corresponding physical address of a desired logical address be improved, but also the memory space occupied by the mapping tables and the time required to find the corresponding physical address can be greatly reduced.

According to an embodiment of the invention, besides the P2L table discussed above, the micro-processor 112 may further establish a logical address section table, which is also called a Current Block Hit Table (CBHT), and may store the logical address section table in the buffer memory 116. The logical address section table records the statuses of a plurality of logical address sections, where one status corresponds to one logical address section. Each status is utilized to indicate whether the P2L table 200 records any logical address that belongs to the corresponding logical address section. That is, whether the memory block that is currently utilized for receiving data (for example, the current block, such as the memory block B_0 discussed above) stores the data of any logical address that belongs to the corresponding logical address section. In this manner, every time when the memory controller 110 receives a read command to read the data stored in the memory device, the memory controller 110 may first determine whether to search the P2L table 200 according to the status of the corresponding logical address section recorded in the logical address section table.

When the status of a logical address section that a read address belongs to indicates that the P2L table 200 records a logical address that belongs to the corresponding logical address section, the memory controller 110 may determine to search the P2L table 200 any further. When the status of a logical address section that the read address belongs to indicates that the P2L table 200 does not record any logical address that belongs to the corresponding logical address section, the memory controller 110 may determine not to search the P2L table 200 any further, and may determine to search another mapping table (which will be discussed in the following paragraphs). In this manner, the time required to find the physical address corresponding to the read address can be greatly reduced.

According to an embodiment of the invention, each logical address section comprises a range of logical addresses, and the range is the same as the range of addresses recorded in a logical to physical address mapping table which is utilized by the memory device. Generally, there may be a global logical to physical address mapping table (hereinafter called a GL2P table) stored in the memory device 120, and the GL2P table may comprises a plurality of local logical to physical address mapping tables (hereinafter called L2P tables). Each L2P table may comprise the mapping information of a range of logical addresses. In an exemplary scenario of managing the memory blocks, the memory blocks may be divided into three groups, including a current block, a data block and a spare block, depending on the status of use. When the host device 130 writes data into the data storage device 100, the micro-processor 112 may select a memory block from the spare block group as a current block, write data into the current block and maintain a P2L table for the current block in the buffer memory 116. When the current block is full, the micro-processor 112 may store the P2L table of the current block into the memory device 120 and update content of the plurality of L2P tables stored in the memory device 120. Then, the current block becomes a data block.

Figure 3:
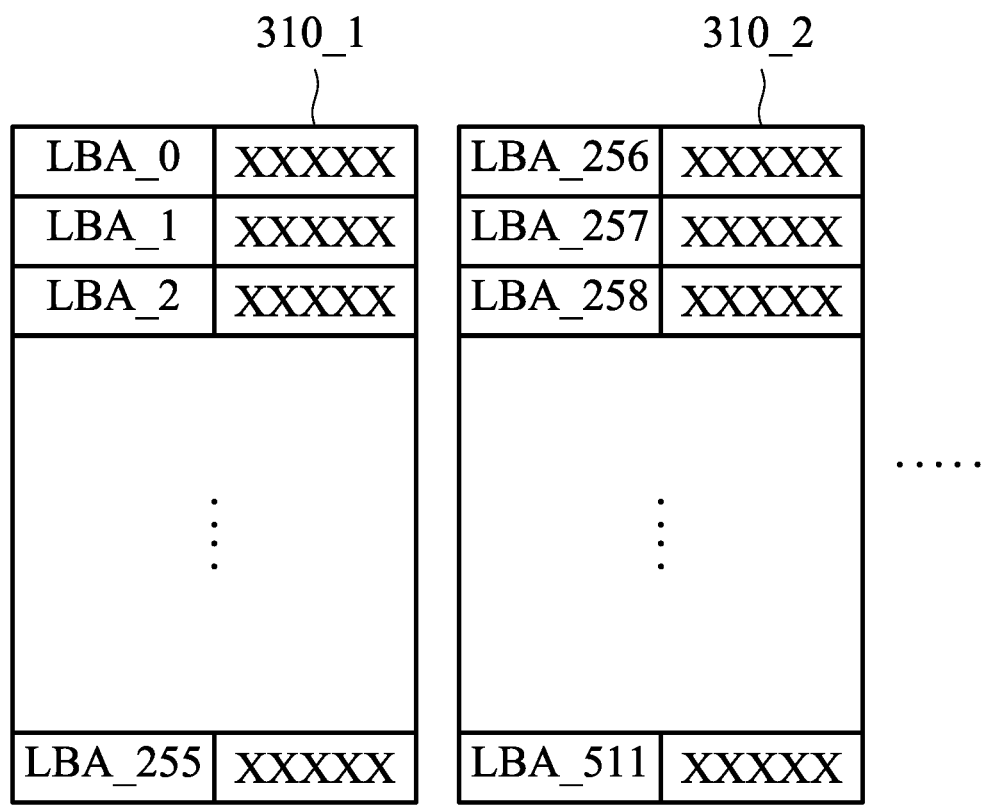
FIG. 3 is an exemplary block diagram of a logical to physical address mapping table according to an embodiment of the invention.

FIG. 3 is an exemplary block diagram of a logical to physical address mapping table according to an embodiment of the invention. The L2P tables 310_1 and 310_2 comprise consecutive logical addresses and their corresponding physical addresses, where the first L2P table 310_1 is utilized to store the corresponding physical addresses for logical addresses LBA_0~LBA_255, the second L2P table 310_2 is utilized to store the corresponding physical addresses for logical addresses LBA_256~LBA_511, the third L2P table may be utilized to store the corresponding physical addresses for logical addresses LBA_512~LBA_767, and so on. It should be noted that it is not necessary for each logical address to have a corresponding physical address in the table. For example, the value "0xFFFFFF" may be utilized to indicate that there is no physical address that corresponds to the logical address.

Therefore, in an embodiment of the invention, the first logical address section (for example, the Section_0) may comprise a range of logical addresses LBA_~LBA_255. That is, when any logical address among the logical addresses LBA_0~LBA_255 is recorded in the P2L table 200, the memory controller 110 may accordingly set the status of the first logical address section in the logical address section table, such that the status of the first logical address indicates that the P2L table 200 records at least one logical address that belongs to the first logical address section.

According to an embodiment of the invention, the logical address section table is a multi-dimensional table, which comprises a plurality of section bits in a plurality of dimensions. The section bits are utilized to distinguish between different logical address sections.

FIG. 4 is an exemplary schematic diagram showing the logical address sections recorded in the logical address section table according to an embodiment of the invention. According to an embodiment of the invention, the logical address section table 400 may at least comprise one or more section bits of a first dimension and one or more section bits of a second dimension. For example, the section bits Bit_0, Bit_1, Bit_2, . . . Bit_7 of the first dimension and the section bits *Bit_0, *Bit_1, *Bit_2, . . . *Bit_7 of the second dimension. The number of section bits for each dimension can be flexibly designed based on the requirements. Therefore, the invention should not be limited to the 8-bits utilized in this embodiment. Generally, the larger the size (capacity) of the memory, the more section bits that can be used. In this manner, a higher accuracy can be achieved for the memory controller 110 to correctly determine whether the physical address corresponding to the logical address to be read is recorded in the P2L table.

According to an embodiment of the invention, the status of each logical address section is represented by the digital values of the corresponding sections bits recorded in the logical address section table. For example, the section bits of the first dimension are utilized to represent the statuses of a plurality of logical address sections having the section numbers differ from each other by a fixed value. The section bits of the second dimension are utilized to represent the statuses of a plurality of logical address sections having consecutive section numbers. For example, the section bit Bit_0 of the first dimension is shared by the logical address sections Section_0, Section_8, Section_16 . . . having section numbers differ from each other by a fixed value (for example, 8) and is utilized to represent the status of any of the logical address sections Section_0, Section_8, Section_16 . . . (where the labeled number represents the section number of the corresponding logical address section). The section bit Bit_1 of the first dimension is shared by the logical address sections Section_1, Section_9, Section_

17 . . . having section numbers differ from each other by a fixed value (for example, 8) and is utilized to represent the status of any of the logical address sections Section_1, Section_9, Section_17, and so on. The section bit *Bit_0 of the second dimension is shared by the logical address sections Section_0~Section_7 having consecutive section numbers and is utilized to represent the status of any of the logical address sections Section_0~Section_7, the section bit *Bit_1 of the second dimension is shared by the logical address sections Section_8~Section_15 having consecutive section numbers and is utilized to represent the status of any of the logical address sections Section_8~Section_15, and so on. Therefore, the combination of the section bits Bit_x of the first dimension and *Bit_n of the second dimension is utilized to represent the status of the logical address section Section_(8n+x), where n and x may be 0 or positive integers. The range of the numbers n and x depends on the number of bits adopted in each dimension. By using the section bits, different logical address sections can be identified.

It should be noted that the logical address section table 400 shown in FIG. 4 is merely an example of a multi-dimensional logical address section table, and the invention should not be limited thereto. As long as the logical address section table can use multi-dimensional section bits to indicate whether the P2L table 200 records any logical address of each logical address section, the structures of a multi-dimensional logical address section table may vary, and those design changes should still be subjected to the scope of the invention. In addition, it should be noted that the number of logical address sections shown in FIG. 4 are merely an example for simplifying the description. The number of logical address sections comprised in the memory device 120 actually depends on the capacity of the memory device 120.

According to an embodiment of the invention, the digital value of the section bit Bit_x of the first dimension and the digital value of the section bit *Bit_n of the second dimension may be set to '0' or '1'. The status of each logical address section is represented by the digital values of the corresponding sections bits recorded in the logical address section table. For example, when the digital value of the section bit Bit_0 is set to a predetermined value, such as the value '1', it means that the P2L table 200 records at least one logical address comprised in one of the logical address sections Section_0, Section_8, Section_16 . . . etc. Similarly, when the digital value of the section bit *Bit_0 is set to a predetermined value, such as the value '1', it means that the P2L table 200 records at least one logical address comprised in one of the logical address sections Section_0~Section_7.

On the other hand, when the digital value of the section bit Bit_0 is set to another predetermined value, such as the value '0', it means that the P2L table 200 does not record any logical address comprised in the logical address sections Section_0, Section_8, Section_16 . . . etc. Similarly, when the digital value of the section bit *Bit_0 is set to another predetermined value, such as the value '0', it means that the P2L table 200 does not record any logical address comprised in the logical address sections Section_0~Section_7.

In other words, when the digital values of the section bits Bit_0 and *Bit_0 are both set to the value '1', it means that the P2L table 200 records at least one logical address comprised in the logical address section Section_0.

FIG. 5 is a schematic diagram of a logical address section table according to an embodiment of the invention. In FIG. 5, the content recorded in the logical address section table 500 is shown, where the values in the parentheses (*Bit, Bit) are the digital values of the section bits *Bit and Bit. According to an embodiment of the invention, when the digital values of the section bits corresponding to a specific logical address section are both set to the value '1' in the logical address section table, such as the (1,1) shown in FIG. 5, it means that the P2L table 200 records at least one logical address comprised in the corresponding logical address section.

Figure 6:
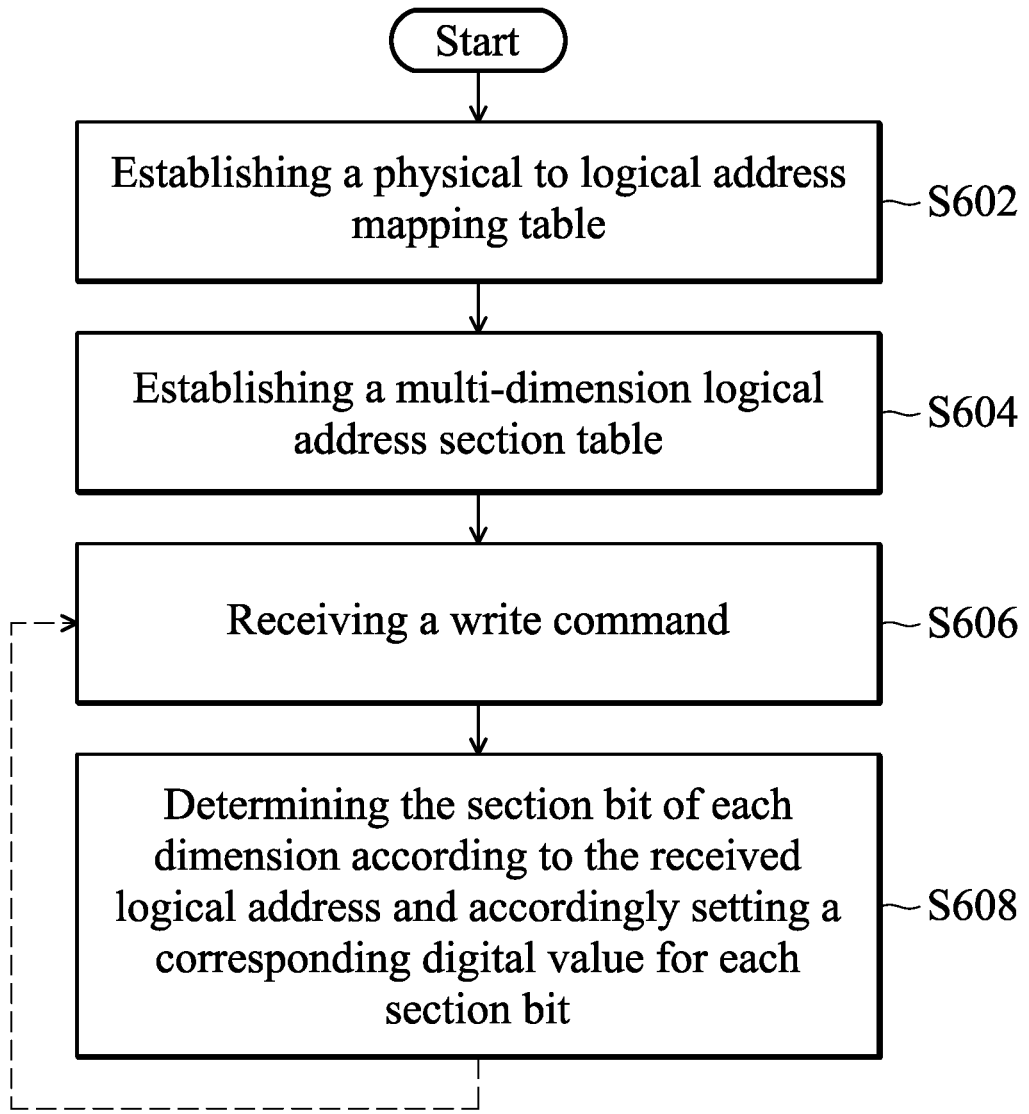
FIG. 6 is a flow chart of a data processing method for a data storage device applying the multi-dimension logical address section table according to an embodiment of the invention.

FIG. 6 is a flow chart of a data processing method for a data storage device applying the multi-dimension logical address section table according to an embodiment of the invention. First of all, the memory controller 110 is configured to establish a physical to logical address mapping table (Step S602). As discussed above, the physical to logical address mapping table may comprise consecutive physical addresses and their corresponding logical addresses. Next, the memory controller 110 is configured to establish a multi-dimension logical address section table (Step S604). The logical address section table records the statuses of a plurality of logical address sections. Each status corresponds to one logical address section and is utilized to indicate whether the physical to logical address mapping table records at least one logical address that belongs to the corresponding logical address section. The multi-dimension logical address section table comprises a plurality of section bits in a plurality of dimensions, so as to distinguish between different logical address sections by the section bits. Next, every time when the memory controller 110 receives a write command requesting to write data of a predetermined logical address to the memory device (Step S606), the memory controller 110 is configured to determine the section bit of each dimension corresponding to the logical address according to the received logical address and accordingly set a corresponding digital value for each section bit of the corresponding logical address (Step S608).

According to an embodiment of the invention, a logical address comprises a plurality of bits. In step S608, the memory controller 110 is configured to calculate the section bits of the corresponding logical address in different dimensions according to different bits, and then set the corresponding digital value for each section bit. For example, the memory controller 110 may first obtain a section number corresponding to a predetermined logical address according to the bits of the predetermined logical address, and then determine the section bits of the predetermined logical address in different dimensions according to the section number.

FIG. 7A and FIG. 7B show the section numbers and the corresponding section bits of a 2-dimensional logical address section table according to an embodiment of the invention. According to an embodiment of the invention, suppose that a logical address comprises 14 bits, and a logical address section is designed to comprise 256 logical addresses. The memory controller 110 may first discard the last 8 bits of the logical address to directly obtain the section number of the logical address section corresponding to this logical address. That is, the last 8 bits selected along the direction from the LSB to the MSB are discarded to obtain the corresponding section number. After discarding a portion of bits, the remaining bits (which are represented by binary values) of the logical address are converted to obtain the corresponding section number (which is represented by a decimal value).

Next, suppose that there are K section bits adopted in the first dimension, where K is a positive integer, the memory controller 110 may perform a modulo operation on the section number corresponding to this logical address as the equation (Section_No mod K), and the remainder obtained after the modulo operation is the section bit in the first dimension corresponding to this logical address. For example, if the remainder obtained after the modulo operation (Section_No mod K) is 0, the section bit in the first dimension corresponding to this logical address is Bit_0. As another example, if the remainder obtained after the modulo operation (Section_No mod K) is 1, the section bit in the first dimension corresponding to this logical address is Bit_1. The other section bits can be obtained in a similar manner.

Next, suppose that there are K section bits adopted in the first dimension and L section bits adopted in the second dimension, where L is as positive integer, the memory controller 110 may perform a division operation on the section number by dividing the section number by K to obtain a quotient, and then perform a modulo operation on the obtained quotient as the equation (Quotient mod L), and the remainder obtained after the modulo operation is the section bit in the second dimension corresponding to this logical address. For example, if the remainder obtained via the modulo operation (Quotient mod L) is 0, the section bit in the second dimension corresponding to this logical address is *Bit_0. As another example, if the remainder obtained via the modulo operation (Quotient mod L) is 1, the section bit in the second dimension corresponding to this logical address is *Bit_1. The other section bits in the second dimension can be obtained in a similar manner.

The results obtained via the operations illustrated above is equal to directly converting a portion of the bits of that logical address. That is, the same result can be obtained even if different operations are performed. To be more specific, the memory controller 110 may directly take a first portion of the bits of a logical address and perform a binary to decimal conversion on the first portion of the bits to obtain the section bit corresponding to this logical address in the first dimension, and directly take a second portion of the bits of this logical address and perform a binary to decimal conversion on the second portion of the bits to obtain the section bit corresponding to this logical address in the second dimension. For example, suppose that a predetermined logical address is 11001000001111, the section number of a logical address section that this predetermined logical address belongs to is 50. The memory controller 110 may take the $11^{th} \sim 9^{th}$ bits (which are numbered along the direction from the LSB to the MSB) and perform a binary to decimal conversion on these three bits 010 to obtain a value 2 as the section bit corresponding to this logical address in the first dimension. The memory controller 110 may also take the $14^{th} \sim 12^{th}$ bits and perform a binary to decimal conversion on these three bits 110 to obtain a value 6 as the section bit corresponding to this logical address in the second dimension. The results obtained by performing the binary to decimal conversions will be the same as performing the division and/or operations illustrated above.

In other words, according to an embodiment of the invention, in practice, the number of dimensions adopted to build up a logical address section table and how many section bits are required in each dimension may be determined based on the number of bits of a logical address. In the example discussed above, if the 6 bits that remain after discarding the last 8 bits of the logical address are divided into two portions, where each portion comprises three bits, it means that two dimensions are adopted to build up a logical address section table and each dimension comprises 2^3=8 section bits.

FIG. 8A and FIG. 8B show the section numbers and the corresponding section bits of a 3-dimensional logical address section table according to an embodiment of the invention. In this embodiment, suppose that a logical address comprises 14 bits, and a logical address section is designed to comprise 256 logical addresses. The memory controller 110 may first discard the last 8 bits of a logical address and directly obtain the section number of a logical address section corresponding to this logical address.

Next, suppose that there are K section bits adopted in the first dimension, L section bits adopted in the second dimension and M section bits adopted in the third dimension, where K, L, M are positive integers, the memory controller 110 may perform a modulo operation on the section number corresponding to this logical address as the equation (Section_No mod K), and the remainder obtained after the modulo operation is the section bit in the first dimension corresponding to this logical address. Next, the memory controller 110 may perform a division operation on the section number by dividing the section number by K to obtain a quotient Quotient, and then perform a modulo operation on the obtained quotient Quotient as the equation (Quotient mod L), and the remainder obtained after the modulo operation is the section bit in the second dimension corresponding to this logical address. Next, the memory controller 110 may perform a division operation on the section number by dividing the section number by K to obtain a quotient Quotient, perform a division operation on the obtained quotient Quotient by dividing the obtained quotient Quotient by L to obtain a quotient Quotient', and then perform a modulo operation on the obtained quotient Quotient' as the equation (Quotient' mod M), and the remainder obtained after the modulo operation is the section bit in the third dimension corresponding to this logical address.

Taking a logical address belonging to the logical address section 50 as an example, and supposing that the first dimension, the second dimension and the third dimension all adopt 4 section bits, the memory controller 110 may perform the modulo operation on the section number 50 corresponding to this logical address by calculating (50 mod 4) to obtain the remainder 2, which is the section bit in the first dimension corresponding to this logical address. The memory controller 110 may then perform a division operation on the section number 50 corresponding to the logical address by dividing 50 by 4 to obtain the quotient 12, and then perform a modulo operation on obtained quotient 12 by calculating (12 mod 4) to obtain the remainder 0, which is the section bit in the second dimension corresponding to this logical address. The memory controller 110 may then perform a division operation on the section number 50 corresponding to the logical address by dividing 50 by 4 to obtain the quotient 12, and then perform a division operation on the quotient 12 by dividing 12 by 4 to obtain the quotient 3, and then perform a modulo operation on obtained quotient 3 by calculating (3 mod 4) to obtain the remainder 3, which is the section bit in the third dimension corresponding to this logical address.

The results obtained via the operations illustrated above are equal to directly converting a portion of the bits of that logical address. To be more specific, the memory controller 110 may directly take a first portion of the bits of the logical address and perform a binary to decimal conversion on the first portion of the bits to obtain the section bit corresponding to the logical address in the first dimension, directly take a second portion of the bits of the logical address and perform a binary to decimal conversion on the second portion of the bits to obtain the section bit corresponding to the logical address in the second dimension, and directly take a third portion of the bits of the logical address and perform a binary to decimal conversion on the third portion of the bits to obtain the section bit corresponding to the logical address in the third dimension, and so on. For example, suppose that a predetermined logical address is 11001000001111, the section number of the logical address section that the predetermined logical address belongs to is 50. The memory controller 110 may take the $10^{th}$~$9^{th}$ bits (which are numbered along the direction from the LSB to the MSB) and perform a binary to decimal conversion on these two bits 10 to obtain a value 2 as the section bit corresponding to this logical address in the first dimension. The memory controller 110 may also take the $12^{th}$~$11^{th}$ bits and perform a binary to decimal conversion on these two bits 00 to obtain a value 0 as the section bit corresponding to this logical address in the second dimension. The memory controller 110 may also take the $18^{th}$~$13^{th}$ bits and perform a binary to decimal conversion on these two bits 11 to obtain a value 3 as the section bit corresponding to this logical address in the third dimension. The results obtained by performing the binary to decimal conversions will be the same as performing the division and/or modulo operations illustrated above.

When the number of dimensions adopted to build up a logical address section table is greater than 3, the section bit of each dimension can all be obtained by performing the division and modulo operations or the binary to decimal conversions discussed above.

Figure 9:
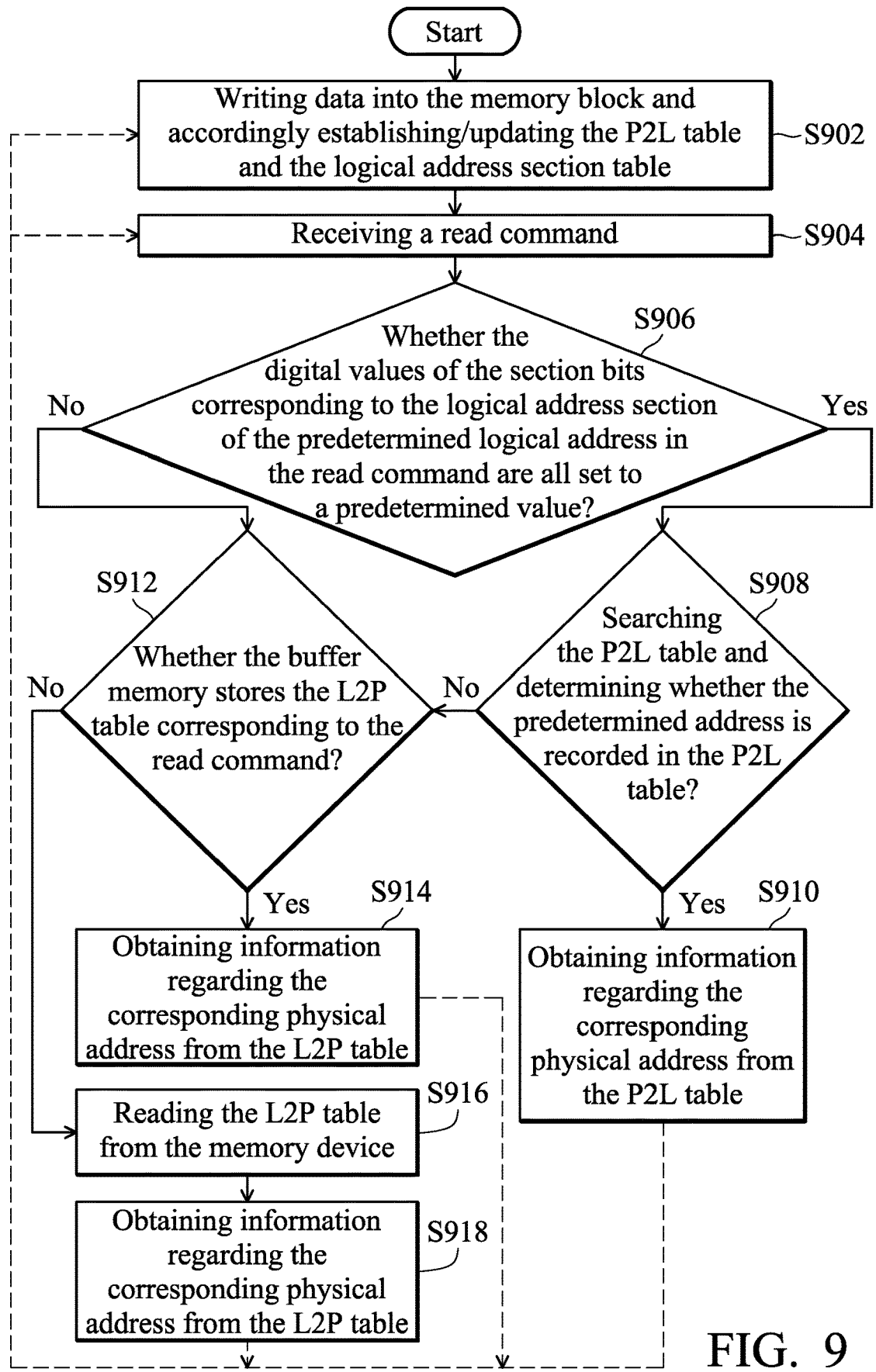
FIG. 9 is a flow chart of a method for accessing the memory device according to an embodiment of the invention.

FIG. 9 is a flow chart of a method for accessing the memory device according to an embodiment of the invention. The flow begins when the memory controller 110 receives at least one write command from the host device 130 to write data into a memory block, such as the memory block B_0, of the memory device 120. In step S902, the memory controller 110 is configured to write the data into the memory block and accordingly establish/update the P2L table and the logical address section table, such as the P2L table 200 and the logical address section table 500. As discussed above, the memory controller 110 may obtain the section bit in each dimension corresponding to a first predetermined logical address comprised in the write command according to the first predetermined logical address.

In step S904, the memory controller 110 receives a read command from the host device 130 which is requesting to read the data of a second predetermined logical address from the memory device 120. Next, in step S906, the memory controller is configured to determine the status of a logical address section corresponding to the second predetermined logical address. For example, the memory controller 110 may determine whether the digital values of the section bits corresponding to the logical address section that the second predetermined logical address belongs to are all set to a predetermined value, such as the value '1'. As discussed above, the memory controller 110 may obtain the section bits corresponding to the logical address section of the second predetermined logical address based on the second predetermined logical address comprised in the read command and check the values of the section bits recorded in the logical address section table. If so, the step S908 is performed. If not, the S912 is performed.

It should be noted that in other embodiments of the invention, in step S906, the memory controller 110 may also check whether the value of the section bit recorded in the logical address section table is set to the predetermined value one after one. If any section bit is not set to the predetermined value, the S912 is performed.

According to an embodiment of the invention, when the digital values of the section bits corresponding to the logical address section of the second predetermined logical address (the read address) are all set to the predetermined value, it means that the status shows that the P2L table has recorded at least one logical address of the logical address section that the read address belongs to. Therefore, the memory controller 110 may determine whether the P2L table has recorded at least one logical address of the logical address section that the second predetermined logical address belongs to according to the digital values of the section bits, so as to determine whether to search the P2L table.

In step S908, the memory controller 110 is configured to search the P2L table, so as to determine whether the second predetermined address is recorded in the P2L table. If so, step S910 is performed. If not, step S912 is performed. In step S910, the memory controller 110 is configured to directly obtain the physical address corresponding to the second predetermined logical address by searching the P2L table stored in the buffer memory 116, and read the data stored in the physical address from the memory device 120 based on the obtained physical address.

In step S912, since the digital values of the section bits corresponding to the logical address section of the second predetermined logical address are not all set to the predetermined value, it means that the P2L table does not record any information regarding the second predetermined logical address (that is, the memory block B_0 does not store the data of the second predetermined logical address). Therefore, the memory controller 110 does not have to search the P2L table and may directly determine whether the buffer memory 116 comprises the L2P table which comprises the second predetermined logical address. For example, suppose that the second predetermined logical address is LBA_700, the memory controller 110 may determine whether the buffer memory 116 comprises the L2P table which stores information regarding the logical addresses LBA_512~LBA_767. If so, step S914 is performed. If not, step S916 is performed.

In step S914, since the buffer memory 116 comprises the L2P table which stores information regarding the logical addresses LBA_512~LBA_767, the memory controller 110 may directly obtain the physical address corresponding to the second predetermined logical address LBA_700 by searching the L2P table and read the data stored in the physical address from the memory device 120 based on the obtained physical address.

In step S916, since the buffer memory 116 does not comprise the L2P table which stores information regarding the logical addresses LBA_512~LBA_767, the memory controller 110 is configured to read the L2P table storing information regarding the logical addresses LBA_512~LBA_767 from the memory device 120 and store it in the buffer memory 116. Next, in step S918, the memory controller 110 may obtain the physical address corresponding to the second predetermined logical address LBA_700 by searching the L2P table loaded in the buffer memory 116 in step S916 and read the data stored in the physical address from the memory device 120 based on the obtained physical address.

The flow may then return to the step S902 to keep writing the data in the memory block B_0 and accordingly establishing/updating the P2L table and the logical address section table, or return to the step S904 to receive a subsequent read command. In addition, if the memory controller 110 keeps writing data into the memory block B_0, since the data to be written may be an update of the data that has already been written before (that is, having the same logical address), in order to avoid any mistake being occurred in the subsequent table lookup operation, once the data is written into the block B_0, the one or more L2P tables previously loaded in response to a read command will be set to an invalid state. That is, the L2P tables loaded in the buffer memory 116 will be marked as invalid or deleted.

Referring to the embodiments as discussed above, when the memory controller 110 receives the read command, the memory controller 110 will check the logical address section table stored in the buffer memory 116 to determine whether information regarding the logical address comprised in the read command is possibly recorded in the P2L table stored in the buffer memory 116. If the logical address section table records a status which indicates that the logical address comprised in the read command is not recorded in the P2L table, there is no need for the memory controller 110 to search the P2L table. The memory controller 110 may obtain the corresponding physical address from the L2P table originally stored in the buffer memory 116 or from the L2P loaded from the memory device 120. Therefore, in the embodiments of the invention, the number of invalid searches in the P2L table can be greatly reduced, and the reading speed and the performance of the data storage device can be improved.

In addition, in the embodiments of the invention, the number of dimensions of the logical address section table and the number of section bits adopted in each dimension can be flexibly designed, so as to reduce the memory space occupied by the logical address section table in the buffer memory 116. As discussed above, in the embodiments of the invention, the number of dimensions of the logical address section table and the number of section bits adopted in each dimension can be determined based on the number of bits comprised in a logical address (that is, the size of the memory device 120).

For example, provided that the logical addresses comprised in the memory device 120 are grouped into 64 logical address sections, if the logical address section table is a one-dimensional table, 64 section bits are required. When the capacity of the memory device 120 increases, the number of section bits required for building such one-dimensional logical address section table increases, accordingly.

If the logical address section table is a two-dimensional table as per the example shown in FIG. 7A and FIG. 7B, the status of these 64 logical address sections can be recorded by the section bits in two dimensions. Therefore, only 16 (that is, 8+8=16) section bits are required, which is much lower than the number of section bits required for building the one-dimensional logical address section table.

If the logical address section table is a three-dimensional table as shown in the example illustrated in FIG. 8A and FIG. 8B, the statuses of these 64 logical address sections can be recorded by the section bits in three dimensions. Therefore, only 12 (that is, 4+4+4=12) section bits are required, which is even lower than the number of section bits required for building the one-dimensional logical address section table and the two-dimensional logical address section table.

Similarly, when higher dimensions (for example, 4 dimensions, 5 dimensions, and so on) are utilized to build up the logical address section table for recording the status of these 64 logical address sections, the number of section bits can be reduced even further. When the size of the memory device 120 increases, the benefit of using the multi-dimensional logical address section table to reduce the memory space occupied by such a table in the buffer memory 116 is more pronounced.

In addition, when using the same number of section bits to build up the logical address section tables in different dimensions, higher accuracy can be achieved when larger dimensions are used. For example, when only 16 section bits are allowed for building up the logical address section table due to the limitations of the size of the buffer memory 116 and the logical addresses comprised in the memory device 120 are grouped into 64 logical address sections, if the logical address section table is a one-dimensional table, it means that 4 logical address sections should share one section bit. In this manner, the accuracy of the logical address section table is only 25%.

If the logical address section table is a two-dimensional (or higher) table, each logical address section can correspond to a unique set of section bits. Therefore, the accuracy of the logical address section table can be 100%. In other words, when the number of section bits is fixed, the higher dimensions are utilized, the more logical address sections can be distinguished from each other via the section bits, and the higher the accuracy can be achieved.

Therefore, via the proposed multi-dimensional logical address section table and the data processing method for the data storage device applying the multi-dimension logical address section table, the access performance of the data storage device can be improved and the memory space occupied by the table can be reduced. In addition, the accuracy of determining whether the P2L table stores a physical address corresponding to a predetermined logical address can be greatly improved and the time required to find the required physical address can be greatly reduced.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A data storage device, comprising:
    a memory device; and
    a memory controller, coupled to the memory device, configured to access the memory device and establish a physical to logical address mapping table and a logical address section table, wherein the physical to logical address mapping table comprises consecutive physical addresses and their corresponding logical addresses, wherein the logical address section table records statuses of a plurality of logical address sections, wherein one status corresponds to one logical address section and each status is utilized to indicate whether the physical to logical address mapping table records any logical address that belongs to the corresponding logical address section, and wherein the logical address section table comprises a plurality of section bits in a plurality of dimensions, so as to distinguish between different logical address sections, and
    wherein when the memory controller receives a write command to write data of a first predetermined logical address to the memory device, the memory controller is configured to determine the section bit of each dimension corresponding to the first predetermined logical address according to the first predetermined logical address, and accordingly set a corresponding digital value for each section bit.

2. The data storage device as claimed in claim 1, wherein the status of each logical address section is represented by the digital values of the corresponding sections bits recorded in the logical address section table.

3. The data storage device as claimed in claim 1, wherein the logical address section table at least comprises one or more section bits of a first dimension and one or more section bits of a second dimension, and wherein when the memory controller receives a read command to read data from the memory device, the memory controller is configured to obtain a first section bit of the first dimension and a second section bit of the second dimension according to a second predetermined logical address comprised in the read command.

4. The data storage device as claimed in claim 3, wherein the memory controller is further configured to determine whether the physical to logical address mapping table records any logical address of the logical address section that the second predetermined logical address belongs to according to the digital value of the first section bit and the digital value of the second section bit recorded in the logical address section table, so as to determine whether to search the physical to logical address mapping table.

5. The data storage device as claimed in claim 4, wherein when the digital value of the first section bit and the digital value of the second section bit are both set to a predetermined value, the memory controller determines to search the physical to logical address mapping table, so as to obtain a predetermined physical address corresponding to the second predetermined logical address for reading the data from the memory device.

6. The data storage device as claimed in claim 1, wherein each logical address section comprises a range of logical addresses, and the range is the same as a range of addresses recorded in a logical to physical address mapping table which is utilized by the memory device.

7. The data storage device as claimed in claim 1, wherein the first predetermined logical address comprises a plurality of bits, and the memory controller is configured to calculate the corresponding section bits of the first predetermined logical address in different dimensions according to different bits.

8. A data processing method for a data storage device comprising a memory device and a memory controller coupled to the memory device for accessing the memory device, comprising:
    establishing a physical to logical address mapping table, wherein the physical to logical address mapping table comprises consecutive physical addresses and their corresponding logical addresses;
    establishing a logical address section table, wherein the logical address section table records statuses of a plurality of logical address sections, one status corresponds to one logical address section and each status is utilized to indicate whether the physical to logical address mapping table records any logical address that belongs to the corresponding logical address section, and wherein the logical address section table comprises a plurality of section bits in a plurality of dimensions, so as to distinguish between different logical address sections, and
    receiving a write command to write data of a first predetermined logical address to the memory device; and
    determining the section bit of each dimension corresponding to the first predetermined logical address according to the first predetermined logical address and accordingly setting a corresponding digital value for each section bit.

9. The method as claimed in claim 8, wherein the status of each logical address section is represented by the digital values of the corresponding sections bits recorded in the logical address section table.

10. The method as claimed in claim 8, wherein the logical address section table at least comprises one or more section bits of a first dimension and one or more section bits of a second dimension, and the method further comprises:
    receiving a read command to read data from the memory device; and
    obtaining a first section bit of the first dimension and a second section bit of the second dimension according to a second predetermined logical address comprised in the read command.

11. The method as claimed in claim 10, further comprising:
    determining whether the physical to logical address mapping table records any logical address of the logical address section that the second predetermined logical address belongs to according to the digital value of the first section bit and the digital value of the second section bit recorded in the logical address section table, so as to determine whether to search the physical to logical address mapping table.

12. The method as claimed in claim 11, further comprising:
    when the digital value of the first section bit and the digital value of the second section bit are both set to a predetermined value, determining to search the physical to logical address mapping table, so as to obtain a predetermined physical address corresponding to the second predetermined logical address for reading the data from the memory device.

13. The method as claimed in claim 8, wherein each logical address section comprises a range of logical addresses, and the range is the same as a range of addresses of recorded in a logical to physical address mapping table which is utilized by the memory device.

14. The method as claimed in claim 8, wherein the first predetermined logical address comprises a plurality of bits, and wherein the step of determining the section bit of each dimension corresponding to the first predetermined logical address according to the first predetermined logical address and accordingly setting a corresponding digital value for each section bit further comprises:
    calculating the corresponding section bits of the first predetermined logical address in different dimensions according to different bits.

* * * * *